Nov. 19, 1963   N. N. ESTES   3,111,610
ELECTROCHEMICAL DIODE RECTIFIER
Filed Nov. 28, 1958
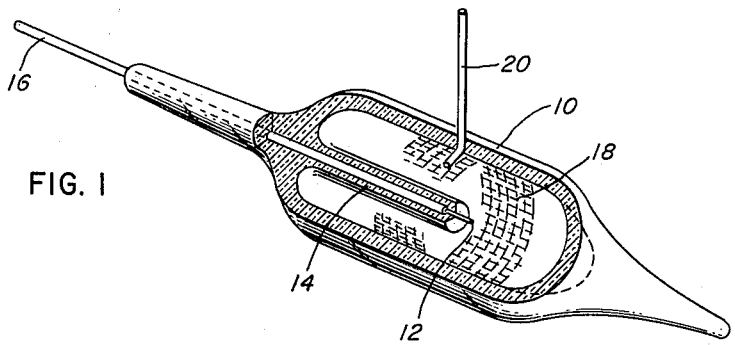
FIG. 1
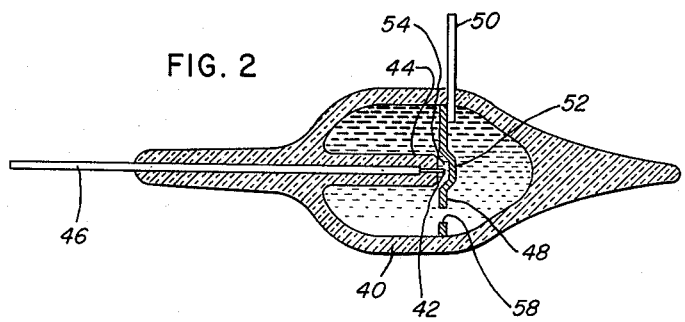
FIG. 2
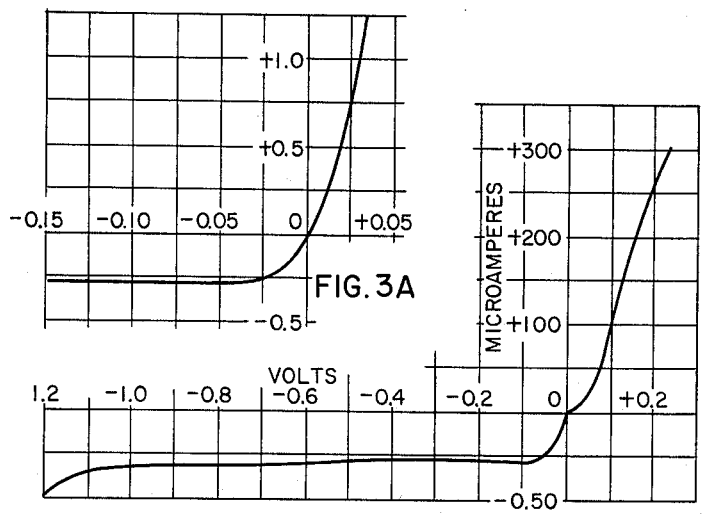
FIG. 3A
FIG. 3
INVENTOR.
NELSON N. ESTES.
BY *John F. Hohmann*

United States Patent Office 3,111,610
Patented Nov. 19, 1963

---

3,111,610
ELECTROCHEMICAL DIODE RECTIFIER
Nelson N. Estes, Austin, Tex., assignor to Union Carbide Corporation, a corporation of New York
Filed Nov. 28, 1958, Ser. No. 777,008
5 Claims. (Cl. 317—233)

This invention relates to electrochemical diode rectifiers.

Electrochemical diode rectifiers have been known for many years. In such devices two electrodes composed of two different metals, commonly lead and tantalum, or a metal and carbon, are immersed in a conducting electrolyte, for example sulfuric acid, rectification of an alternating current taking place because of the difference in overall conduction of the cell for opposite directions of impressed voltage on the cell. This difference in conduction was obtained because of the property of the electrodes and electrolyte to generate a nonreversible gaseous product or a solid dielectric product at one of the electrodes or by a combination of both effects. For a variety of reasons these electrochemical or "wet" rectifiers, as they are called, have been outmoded by dry rectifiers, for example of the copper oxide type.

It is the principal object of the present invention to provide improved electrochemical diode rectifiers having superior forward-to-reverse current characteristics particularly at low voltages and low currents. Another important object of the invention is the provision of an electrochemical rectifier which will produce a substantially constant current in the reverse direction upon application of a wide range of voltages thereto.

The invention by means of which these objects are attained will be described with particular reference to the accompanying drawing, in which:

FIG. 1 is a vertical section of an electrochemical diode rectifier embodying the invention;

FIG. 2 is a similar view of another rectifier construction embodying the invention;

FIG. 3 is a curve setting forth characteristics of rectifiers of the type illustrated in FIG. 1; and FIG. 3A is an enlarged portion of the curve of FIG. 3 showing in greater detail its shape as it goes through zero.

The invention is an electrochemical diode rectifier comprising a vessel containing an electrolyte comprising a reversible redox system in solution, and a pair of electrodes inert to the electrolyte mounted therein. One of the electrodes is substantially larger than the other, preferably being several hundred times greater in active surface area. Generally, although not necessarily, one electrode is at least about 400 times greater than the other. The forward conduction of current through the rectifier ordinarily is in the direction of the larger electrode from the smaller depending on the species charge as will be explained below.

Referring to FIG. 1 of the drawing, an electrochemical diode rectifier embodying the invention may comprise a vessel 10, suitably of glass and suitably but not necessarily closed. The vessel 10 is filled with electrolyte. A small electrode 12 suitably of platinum is mounted substantially centrally of the vessel 10 in a re-entrant portion 14 thereof and a suitable lead 16 sealed within the re-entrant portion 14 is attached thereto. Also mounted in the vessel 10 is a larger electrode 18 formed of a generally cylindrical section of metal gauze, suitably platinum, the electrode 18 as shown surrounding the smaller electrode 12. A lead 20 is attached to the electrode 18 and extends outwardly of the vessel 10.

A modified form of rectifier embodying the invention is shown in FIG. 2. In that construction, a vessel 40, suitably of glass, is filled with electrolyte. Similar to the construction of FIG. 1 a small electrode 42 is mounted substantially centrally of the vessel 40 and is supported by a re-entrant portion 44 thereof, a lead 46 being connected to the electrode and extending through the re-entrant portion 44 outwardly of the vessel 40. A large electrode 48, suitably a sheet of platinum, is mounted in the vessel 40 in close propinquity to the small electrode 42. To the electrode 48 is secured a lead 50 extending outwardly of the vessel 40. As illustrated, a depression 52 is provided in the electrode 48, and the electrode 48 is so placed with respect to the electrode 42 that a small compartment 54 is defined by the depression 52 and the electrode 42. Of course the electrodes 42 and 48 must not be in contact with each other. On the other hand, they should be close enough to confine a small volume of electrolyte in the compartment 54. There is sufficient space between the electrodes however, that there is a conductive path between the electrolyte in the compartment 54 and that in the main body of the vessel 40. To permit filling the vessel 40 with solution, an aperture 53 may be provided in the electrode 48.

As above indicated the electrolyte used in the diode of the invention must be a reversible redox system. A number of such systems exist and are well known. These include the iodine-iodide system, the ferrocyanide-ferricyanide system, and the cerous-ceric ion system. All of these are suitable for use in the invention.

When a solution of an electrolyte including such a system is placed in a vessel between electrodes and a current is passed, reduction occurs at one electrode, the cathode, and oxidation occurs at the other electrode, the anode. As current continues to flow, there is a transfer of ions in the vicinity of the electrodes and within the electrolyte. The ions transferred are referred to as "species." The transfer may be measured; the current transferred is proportional to the time of current flow. The quantity of ion transfer in a unit of time is of course dependent in part on the availability of the species in the immediate vicinity of the electrode. In the case of the iodine-iodide system $I_3^-$ is transferred from the immediate cathode area to the immediate anode area. For conciseness the diodes of the invention will be described with particular reference to the use of an electrolyte in the iodine-iodide system and to iodine as the measured species, although as above stated the invention is not limited to such case. If iodide were the measured species, forward conduction of current through the rectifier would be in the direction of the smaller electrode from the larger.

When iodine is dissolved in an aqueous solution of potassium iodide, it exists primarily as the tri-iodide ion:

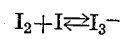

When such an electrolyte is used in a diode and current is passed through the diode, iodine is reduced at the cathode and iodide ions are oxidized at the anode.

Cathode: 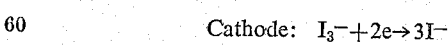

Anode: 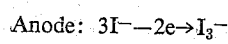

Although by reason of these reactions there is no net change in any component in the solution, the local concentration of iodine ($I_3^-$) has been increased at the anode and decreased at the cathode.

The amount of current that flows through the diode for a given applied voltage depends upon a number of factors: (a) electrolyte resistance through the solution;

(b) the supply of iodide ions to the anode; (c) the supply of iodine to the cathode. By adding a large excess of potassium iodide to the solution and using an anode area large in comparison to the cathode area the effect of the electrolyte resistance and the supply of iodide ions to the anode is minimized so that the current will be regulated almost entirely by the supply of iodine to the cathode. The concentration of iodine at the anode, however, must not be so great that iodine will plate out on that electrode and therefore block it causing the device to cease functioning until the condition is corrected.

In accordance with the principles just discussed, it is desired to provide a relatively large supply of iodine in solution in the cathode area in devices embodying the invention and to provide a good solvent for iodine at the anode area. Because the solubility of iodine in alcohol is higher than it is in water, alcohol (either methyl or ethyl) is a preferred solvent. For best conductivity mixtures of alcohol and water are most desirable. For optimum forward-to-reverse characteristics at very low voltages, say less than 50 millivolts, relatively high concentrations of iodine are desired. Specifically, at about 10 millivolts applied voltage a desirable concentration of iodine is about 0.025 N. For operation under applied voltages of greater than about 50 millivolts a relatively low concentration of iodine is desired. Specifically, at about 0.2 volt or higher a concentration of iodine of about 0.001N provides for good forward-to-reverse characteristics. A solution that has proved satisfactory over a wide voltage range in a number of tests comprises an electrolyte having a concentration of iodine of 0.005 N and a concentration of potassium iodide of about 2.0 N, the solvent being an alcohol-water mixture containing sixty percent ethyl alcohol by volume.

As indicated, the electrolyte used in the rectifier of the invention is dissolved in a solvent. The solvent must dissolve the measured species and permit either it or the unmeasured species to become ionized. For use in the iodine-iodide system, in addition to methyl and ethyl alcohols, the following are useful; amyl alcohol, butyl alcohol, acetonitrile, and a number of organic chlorides. It should be pointed out that water is not a solvent for iodine but in the presence of potassium iodide forms a soluble complex of iodine.

With respect to the disparity in size between electrodes in diodes embodying the invention, it will be recalled that it was stated above that it is preferred that one electrode have an active surface area at least about 400 times that of the other. A specific example of actual electrode sizes will serve to illustrate the magnitude of the size difference. In a number of diodes constructed as illustrated in FIG. 1, the larger electrode was formed of a strip of 80 mesh platinum gauze about ⅛ inch wide and ½ inch long. This strip was formed into a substantially cylindrical electrode. The smaller electrode was simply a piece of platinum wire 0.007 inch long and 0.0014 inch in diameter. In diodes constructed in accordance with the design illustrated in FIG. 2, the larger electrode was formed of a sheet of platinum the effective area of which in contact with the solution was 5/32 inch in diameter. A spherical-bottom depression 0.004 to 0.005 inch deep of about 0.0045 inch diameter was provided. The smaller electrode, mounted in the depression was a platinum wire of 0.001 inch diameter and 0.002 inch long.

At this juncture it should be pointed out that the principal requirements for electrode material satisfactory for use in the diodes of the invention include the requirement that it be inert to the liquids used therein, and that it be impervious to such liquids. A number of metals including iridium, rhodium, palladium and alloys thereof with each other and with platinum may be used, but platinum is generally preferred. Electrodes having active surface areas of pyrolytically deposited carbon such as those described in the copending application of G. E. Evans, R. A. Powers, N. N. Estes and E. S. Snavely, Jr., Serial No. 777,012, now Patent No. 3,054,030, filed concurrently herewith are useful.

The rectifiers of the invention are conveniently produced from glass tubing, for example by blowing a "bubble," mounting the electrodes therein and filling it with solution. The bubble may then be sealed by conventional glass forming techniques. The constructions illustrated are quite strong and rigid and will withstand considerable vibration without damage or detrimental effect on their electrical characteristics.

A number of rectifiers utilizing electrolyte of the composition above described and with platinum electrodes of the above dimensions have been made and tested. These rectifiers were constructed in the manner illustrated in FIG. 1. Reference to FIG. 3 and FIG. 3A will show the characteristics of typical devices so prepared. For example, the steep rise in current output when a voltage of up to 0.2 volt is impressed on the rectifier in the forward direction is evident. It will also be observed that in the reverse direction a substantially constant current is produced over a voltage range of about 0.25 volt to 0.9 volt. Experience has shown the peak inverse voltage rating of such rectifiers to be about 0.9 volt.

As indicated by the curves of FIGS. 3 and 3A at 0.1 volt the ratio of forward-to-reverse currents produced by the rectifier of FIGS. 1 is of the order of 400 to 1. As indicated above, the concentration of iodine in the electrolyte and the disparity of sizes of electrode influence this ratio and have an effect on the magnitude of the current produced in the reverse direction. By appropriate modification of these variables, desired ratios of forward-to-reverse currents can be produced.

The modified construction illustrated in FIG. 2 provides a means of control of the quantity of iodne available to the smaller electrode not present in the case of the construction of FIG. 1. With this construction the reverse current obtained is generally below that obtained with devices constructed in accordance with FIG. 1 and the forward-to-reverse current ratio is generally higher.

The operation of the device of FIG. 2 may be explained as follows: In the initial condition the concentration of iodine in the small compartment 54 is the same as that in the remainder of solution in the vessel 40. When a voltage is applied across the leads 46, 50 such that the electrode 42 is negative with respect to the electrode 48, iodine is reduced at the electrode 42 and iodide is oxidized over the entire surface of the electrode 48 by reason of the conducting path provided between the small compartment 54 and the main body of solution. As this process continues, the iodine concentration within the small compartment 54 drops. This drop in iodine concentration causes a corresponding decrease in the current flowing through the rectifier. Thus, the low concentration of iodine necessary to provide low inverse current characteristics in the rectifier is automatically attained.

On the other hand, when a voltage is applied across the leads 46, 50 such that the electrode 42 is positive with respect to the electrode 48 the reverse situation exists and the iodine concentration is increased in the compartment 54 adjacent to the electrode 42. This produces the high current, low voltage drop characteristic of the higher iodine concentration resulting in desired high forward-to-reverse characteristics for the entire operative voltage range.

The rectifiers of the invention constructed as illustrated in the sizes described are particularly well suited to use in electronic applications where voltages not higher than about 0.9 volt per unit are encountered at frequencies generally below about 0.1 cycle per second.

I claim:

1. An electrochemical diode rectifier comprising a vessel filled with an electrolyte comprising a reversible redox system in solution; and a pair of electrodes inert to said electrolyte mounted therein, one of said electrodes having a substantially larger active surface area than the other, said larger electrode having a depression therein and said smaller electrode being mounted with its active surface area within said depression.

2. A rectifier as defined by claim 1 wherein said larger electrode is at least 400 times greater in active surface area than said smaller electrode.

3. A rectifier as defined by claim 1 wherein said reversible redox system is iodine-iodide.

4. A rectifier as defined by claim 1 wherein said electrodes are of platinum.

5. A rectifier as defined by claim 1 wherein said reversible redox system is cerous-ceric ion.

References Cited in the file of this patent
UNITED STATES PATENTS

| | | | |
|---|---|---|---|
| 673,953 | Hildburgh | May 14, | 1901 |
| 1,179,495 | Burkardt | Apr. 18, | 1916 |
| 1,694,653 | Hall | Dec. 11, | 1928 |
| 1,830,500 | Andre | Nov. 3, | 1931 |
| 2,083,254 | Cowles | June 8, | 1937 |
| 2,685,025 | Root | July 27, | 1954 |
| 2,764,653 | Schoeppel et al. | Sept. 25, | 1956 |
| 2,890,414 | Snavely | June 9, | 1959 |
| 2,910,633 | Hovey | Oct. 27, | 1959 |
| 2,910,648 | Keller | Oct. 27, | 1959 |